United States Patent [19]

Nowak

[11] Patent Number: 4,656,631

[45] Date of Patent: Apr. 7, 1987

[54] PROCESS AND CIRCUIT ARRANGEMENT FOR CHECKING A PROGRAM IN DATA PROCESSING UNITS

[75] Inventor: Gerhard Nowak, Paderborn, Fed. Rep. of Germany

[73] Assignee: Nixdorf Computer AG, Fed. Rep. of Germany

[21] Appl. No.: 698,801

[22] Filed: Feb. 6, 1985

[30] Foreign Application Priority Data

Feb. 10, 1984 [DE] Fed. Rep. of Germany ....... 3404782

[51] Int. Cl.$^4$ .............................................. G06F 11/10
[52] U.S. Cl. .......................................... 371/19; 371/51
[58] Field of Search ................................. 371/3, 51, 19

[56] References Cited

U.S. PATENT DOCUMENTS

| | | | |
|---|---|---|---|
| 3,257,546 | 6/1966 | McGovern | 371/3 |
| 3,465,132 | 9/1969 | Crockett et al. | 371/3 |
| 3,491,337 | 1/1970 | Guzak, Jr. et al. | 371/3 |
| 3,786,415 | 1/1974 | Phillips et al. | 371/3 X |
| 4,355,393 | 10/1982 | Kubo et al. | 371/51 |

OTHER PUBLICATIONS

Kobesky, Diagnostic Parity Error Forcing Mechanism, IBM Technical Disclosure Bulletin, vol. 19, No. 3, Aug. 1976, p. 853.

Primary Examiner—Charles E. Atkinson
Attorney, Agent, or Firm—Cullen, Sloman, Cantor, Grauer, Scott & Rutherford

[57] ABSTRACT

In checking a program in data processing units, the working memory, before the completion of the program, has written into it information to which respectively a false parity signal is assigned. In this way program mistakes in the program to be checked, which can be revealed in a read access to a non-normalized memory cell, are recognized instantly.

4 Claims, 2 Drawing Figures

| ⊕ INVPAR | = PARITY |   |
|---|---|---|
| 1 | 0 | 1 |
| 0 | 0 | 0 |
| 1 | 1 | 0 |
| 0 | 1 | 1 |

PROCESS AND CIRCUIT ARRANGEMENT FOR CHECKING A PROGRAM IN DATA PROCESSING UNITS

FIELD OF THE INVENTION

The invention relates to a process for checking a program in data processing units in which the operating system controls the running of the program to be checked. The program to be checked, before it is loaded into the working memory of the data processing unit, causes normalization of the working memory by writing data with parity signals into the memory cells to be used by it. The operating system causes an interruption of the program to be checked when a parity error occurs. Moreover, the invention relates to a circuit arrangement for carrying out the process.

BACKGROUND OF THE INVENTION

The principle is already known of making a parity check for protecting stored data in data processing units. In this process an additional signal is added to a long uniform sequence of information characters. The value of this additional signal is chosen in a predetermined manner so that with it the number of information characters with a prescribed value above the total unit of the sequence of information characters always reaches an even value or always reaches an odd value. Then with the parity check a parity signal present in a character sequence is compared with a parity signal newly formed by the same process. If the two parity signals do not agree, then there is a parity error, which means that one or more information characters are invalidated by error influences.

When such a parity error occurs, the operating system of a data processing unit can initiate an error routine or can trigger the central processing unit in such a way that the latter interrupts the running of a program which is already started running. In this case, the program may for example remain at a definite address.

A special application case of the parity check is checking the programs in a data processing unit for program mistakes; i.e., program debugging. A data processing unit contains an operating system which controls its basic sequence of operations, that is, the mode of operation of its operational units. Moreover, different user programs can be provided or input which will fulfill the respective application purpose of the data processing unit and thus solve user problems. Such user programs must be checked for program mistakes in the data processing unit under control by the operating system in order to prevent malfunctions from occurring in the running of the respective user program.

A program to be checked causes normalization of all of the memory cells to be used by it in the working memory of the data processing unit before it is actually completed. This means that initial information is written into these memory cells which prevents the memory cells, after the data processing unit is connected in, from still containing information from programs previously run which are not relevant for the running of the program to be checked. However, if the program to be checked contains a program mistake, then the memory cells of the working memory are not normalized in order. Then when in the course of running the program a read access to a non-normalized memory cell occurs, false information is then read out. However, it is not possible to immediately identify the program mistake causing it. Since program mistakes of this type are the most frequent but their analysis is very difficult, since they cannot be identified immediately, there is a need for a checking process which avoids this disadvantage.

Accordingly, it is the objective of the invention to supply a process for checking a program which will make possible the immediate identification of program errors which appear as a defective or erroneous normalization of memory cells.

SUMMARY OF THE INVENTION

A process of the type described above for solving this problem is developed according to the invention in such a way that information with false parity signals is written before the normalization into at least the memory cells to be used by the program to be checked.

When the process is carried out in this manner, then the memory cells of the working memory to be used by the program to be checked can contain no erroneous data or information with correct parity which is no longer relevant, if they are subsequently normalized out of order through a program mistake. A read access to such a memory cell then results in the identification of false parity information, which can directly cause the start of an error routine or the interruption of the program to be tested. Thus a program mistake having the effect of an erroneous normalization can be identified immediately, so that appropriate immediate measures for the analysis and remedying of this error are possible.

A further development of the process is characterized in that a command causing the start of the program to be checked initiates the write-in of the false parity information and only after this write-in is the program started. In this way the write-in of the false parity information always automatically occurs before the normalization. For this the start command for the program to be checked can by its occurrence first cause the central processing unit of the data processing unit, controlled by the operating system, to write in the false parity information, after which the start command is only then passed on to the program to be checked. The actual call of the program to be checked here is therefore done by the central processing unit.

Another possibility for initiating the write-in operation of the false parity information is offered for data processing units in which certain memory regions are dynamically assigned to a program and then released. Here the process can be carried out in such a way that the dynamic release of the respective memory region is used as a criterion for the writing in of the false parity information. In this case, too, the write-in of the false parity information takes place automatically without special measures by users being necessary.

A circuit arrangement for a data processing unit, which contains a parity check with related operational units, is made in a further development of the concept of the invention in such a way that the output of the parity generator, the output which delivers the parity signal, triggers an input of an EXCLUSIVE-OR gate the other input of which is triggered by a gate. The two initial inputs to this gate cause a non-inverting or inverting connection of the parity signal through the EXCLUSIVE-OR gate by the central processing unit in the direction of a correct-parity or false-parity writing-in into the working memory.

A circuit arrangement built in this manner is distinguished by the greatest possible simplicity, so that it can be directly incorporated into existing data processing units as a supplement to the parity check.

An embodiment example of the invention is described in the following on the basis of figures. In these:

DETAILED DESCRIPTION OF THE PREFERRED EMBODIMENT

Figures 1, 2:
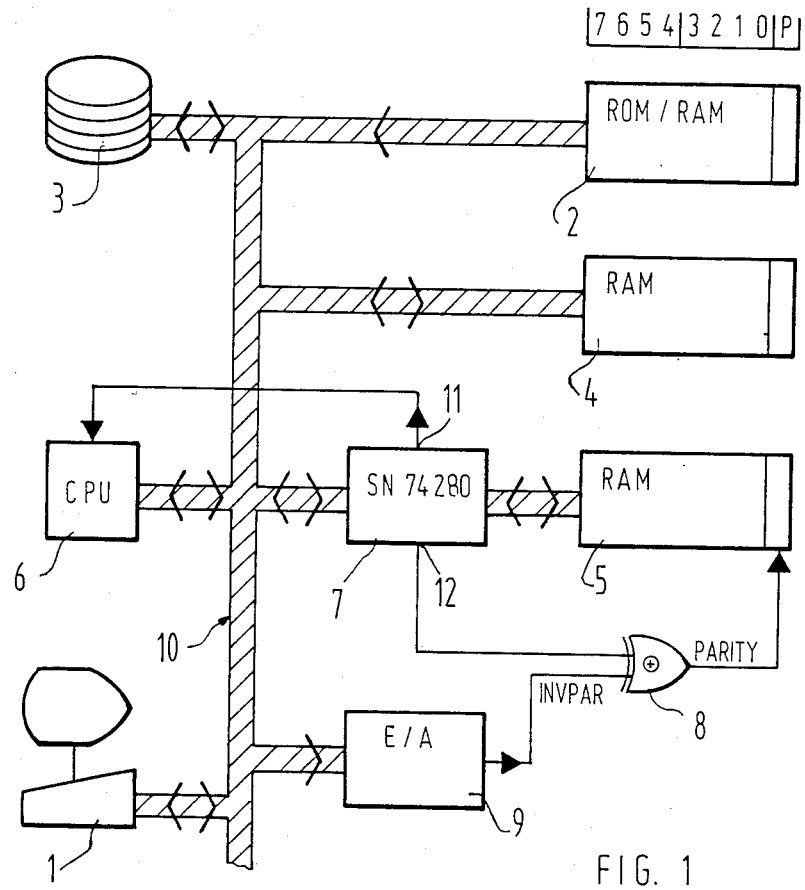
FIG. 1 show a diagrammatic general view of one part of a data processing unit operating according to the invention.
FIG. 2 is a tabular representation of the mode of operation of a single circuit used in the arrangement according to FIG. 1.

FIG. 1 illustrates a part of a data processing unit the operational units of which can communicate with each other by way of a system bus 10. Connected to the system bus 10 is a system control panel 1 by means of which the user can input control commands or select programs to be completed. At the same time the results of the sequence of operations thus initiated are displayed on the system control panel 1. Moreover, the system bus 10 is also connected to a central processing unit 6 which controls the running of the program on the data processing unit. The operating system is located in an operating system memory 2 which may be a read only memory or a random access memory (ROM/-RAM). Besides this a magnetic disk memory 3 is connected to the system bus 10, which memory can contain a number of user programs which can respectively be input for checking purposes into a test program memory 4 which is likewise connected to the system bus 10. This memory is accordingly a random access memory (RAM).

The working memory 5, likewise a random access memory (RAM), is connected with the system bus 10 by way of a parity generator/parity checker 7 of the SN 74280 type. The parity generator/parity checker 7 is connected with the central processing unit 6 by way of a control output 11 delivering a control signal. Parity generator/parity checker 7 delivers a parity signal at a parity signal output 12, which is fed to the working memory 5 by way of an EXCLUSIVE-OR gate 8. The EXCLUSIVE-OR gate 8 is controlled at its other input by the output signal of an input/output channel 9 which is likewise connected with the system bus 10 and contains a gate function.

The memories 2, 4 and 5 are diagrammatically represented in FIG. 2 with a width which corresponds to the length of the eight bit data words to be stored. In addition, another memory location is respectively denoted which is provided for the storage of a parity signal. This is designated by P in the word representation provided above the memories 2, 4 and 5.

The process according to the invention which is carried out before the normalizing of the working memory 5 is initiated by actuating a control key on the system control panel 1 which generates the command "load program". Upon entry of this command the central processing unit 6 causes the operating system in the operating system memory 2 to load a program which is to be checked from the magnetic disk memory 3 into the test program memory 4. It is also possible to load a program to be checked directly from the system control panel 1 or from other data sources into the test program memory 4.

If the program to be checked is located in the test program memory 4, then this can be started by delivering the command "program start." This command is likewise input at the system control panel 1. When it is recognized in the central processing unit 6, the latter first causes the writing of false parity information into the working memory 5 before the command "program start" is passed on to the program to be checked in the test program memory 4. The writing of false parity information into the working memory 5 takes place by means of the parity generator/parity checker 7. For each data item fed to it the parity generator/parity checker 7 generates a parity bit at its parity signal output 12, which bit is fed to the first input of the EXCLUSIVE-OR gate 8.

The central processing unit 6 now controls the input-/outut channel 9, which has a gate function, independently of the checking by the operating system to produce an output signal with the binary value 1. This causes an inversion of the parity bit which is delivered by the parity generator/parity checker 7. This inversion takes place through the EXCLUSIVE-OR gate 8 in a manner yet to be described. The central processing unit 6 can therefore occasion the writing of false parity information into the working memory 5, caused by the command "program start."

If the working memory 5, loaded in this manner with false parity information, is normalized by the program to be checked and then read out in the course of running the program to be checked, then the data items read out are fed to the parity generator/parity checker 7, which then operates as a parity checker. If parity generatory/-parity checker 7 recognizes false parity information and therewith a program mistake, it delivers at its control output 11 an interrupt signal which is fed to the central processing unit 6. This causes the program to be checked to stop at a definite address or initiates an error message routine in an intrinsically known manner.

The mode of operation of the EXCLUSIVE-OR gate 8 is understandable on the basis of the table represented in FIG. 2. For writing in correct parity information, the input/output channel 9 delivers a signal INVPAR with the binary value of 0. If this signal acquires the binary value of 1, then false parity information is to be written into the working memory 5. The respective correct or false priority signal PARITY at the output of the EXCLUSIVE-OR gate 8 then accordingly has one or the other binary value, as is represented in the table of FIG. 2. This table shows the different possible combinations of the binary value of the parity signal which is delivered by the parity signal output 12 of the parity generator/parity checker 7, and of the signal INVPAR, which gives rise to the false or correct parity signal at the output of the EXCLUSIVE-OR gate 8.

What is claimed is:

1. A method for checking a program in a data processing unit, the program to be checked normalizing the working memory by writing data with parity signals into the memory cells of the working memory which are to be used by the program, the data processing system having an operating system for controlling the running of the program and for interrupting the program when data ia recalled from the working memory having a parity error, the improvement comprising:

writing data with false parity signals into at least the memory cells of the working memory to be used by the program to be checked prior to the program to be checked normalizing the working memory.

2. The method as claimed in claim 1 where the data processing unit includes means for receiving a start program command for starting the program to be checked, the improvement further comprising:

initiating said writing data with false parity signals and then starting said program to be checked only after the completion of the writing data with false parity signals in response to a start program command.

3. The method as claimed in claim 1 wherein the data processing unit includes means for dynamically assigning certain memory regions to a program and for dynamically releasing the memory regions assigned to a program, the improvement further comprising:

writing data with false parity signals into released memory regions upon dynamic release of said memory regions by the program to be checked.

4. A data processing unit comprising:

a read/write memory means having a plurality of memory cells for writing and recalling data words and corresponding parity signals;

a central processing unit for manipulating data words recalled from said read/write memory means and writing resulting data in said read/write memory means;

a parity generator/parity checker means connected to said read/write memory means and said central processing unit for checking the parity of data words recalled from said read/write memory means against said corresponding parity signal and signaling said central processing unit upon detection of a parity error and for generating the corresponding parity signal for data words to be written into said read/write memory means;

an exclusive OR circuit having a first input receiving the parity signal generated by said parity generator/parity checker means and a second input receiving a control signal controlled by said central processing unit and an output connected to said read/write memory means for supplying said parity signal corresponding to a data word to be written into said read/write memory means, whereby the state of said control signal controls whether true or false parity signals are written into said read/write memory means; and an operating system memory having stored therein an operating system for control of said central processing unit for writing data words having false parity signals into at least the memory cells of said read/write memory means to be used by a program to be checked by causing said central processing unit to control the state of said control signal supplied to said second input of said exclusive OR circuit.

* * * * *